(12) United States Patent
Wang et al.

(10) Patent No.: US 12,097,421 B2
(45) Date of Patent: Sep. 24, 2024

(54) GOLF BALL SET-TOP DETECTION METHOD, SYSTEM AND STORAGE MEDIUM

(71) Applicant: SHENZHEN GREENJOY TECHNOLOGY CO., LTD., GuangDong (CN)

(72) Inventors: Ji Jun Wang, GuangDong (CN); Qing Hua Wang, GuangDong (CN)

(73) Assignee: SHENZHEN GREENJOY TECHNOLOGY CO., LTD., GuangDong (CN)

( * ) Notice: Subject to any disclaimer, the term of this patent is extended or adjusted under 35 U.S.C. 154(b) by 593 days.

(21) Appl. No.: 17/492,691

(22) Filed: Oct. 4, 2021

(65) Prior Publication Data

US 2022/0088455 A1    Mar. 24, 2022

Related U.S. Application Data

(63) Continuation of application No. PCT/CN2020/131287, filed on Nov. 25, 2020.

(30) Foreign Application Priority Data

Sep. 22, 2020 (CN) .......................... 202011000469.7

(51) Int. Cl.
   *A63B 69/36*      (2006.01)
   *A63B 24/00*      (2006.01)
   *A63B 71/06*      (2006.01)

(52) U.S. Cl.
   CPC ...... *A63B 69/3658* (2013.01); *A63B 24/0021* (2013.01); *A63B 71/0622* (2013.01); *A63B 2024/0031* (2013.01)

(58) Field of Classification Search
   CPC . A63B 71/0605; A63B 67/02; A63B 71/0669; A63B 71/0622;

(Continued)

(56) References Cited

U.S. PATENT DOCUMENTS

2015/0356748 A1 * 12/2015   Kim ..................... H04N 13/239
                                                        382/154
2020/0034989 A1 * 1/2020   Koyama .................. G06T 7/85

FOREIGN PATENT DOCUMENTS

CN       103617614         3/2014
CN       103617614 A   *   3/2014

(Continued)

OTHER PUBLICATIONS

Zhang Yifeng, et al; "Real-Time Spin Estimation of Ping-Pong Ball Using Its Natural Brand"; vol. 64, No. 8; Aug. 1, 2015; pp. 2280-2290.

(Continued)

*Primary Examiner* — Jeffrey S Vanderveen
(74) *Attorney, Agent, or Firm* — Cooper Legal Group, LLC

(57) ABSTRACT

The present application discloses a top-mounted golf ball detection method, applied to a golf system with a top camera configured for detecting a golf ball provided with a mark thereon. The method comprises: calibrating a camera: converting an image coordinate system of the camera into a world coordinate system; positioning a golf ball: acquiring coordinate data of the golf ball by performing a global positioning on an entire first frame picture captured by the camera after the ball is served; and for a subsequent frame picture captured by the camera after the ball is served, predicting a falling point range of the golf ball and obtaining a local picture of the frame picture according to the falling point range, and acquiring coordinate data of the golf ball by performing a global positioning on the local picture; calculating parameters; and detecting a rotating speed of the golf ball.

8 Claims, 10 Drawing Sheets

(58) Field of Classification Search
CPC ..... A63B 2071/0644; A63B 2071/0694; A63F 13/218; A63F 13/426; A63F 13/573; A63F 13/577; A63F 13/812; A63F 13/09
See application file for complete search history.

(56) References Cited

FOREIGN PATENT DOCUMENTS

| | | | | |
|---|---|---|---|---|
| CN | 104504694 | | 4/2015 | |
| CN | 104504694 A | * | 4/2015 | ............... G06T 7/20 |
| CN | 106780620 A | * | 5/2017 | |
| CN | 108596942 | | 9/2018 | |
| CN | 108596942 A | * | 9/2018 | |
| CN | 110298864 | | 10/2019 | |
| CN | 110298864 A | * | 10/2019 | ......... G06K 9/00724 |
| EP | 2032220 B1 | | 10/2013 | |

OTHER PUBLICATIONS

European Patent Office; European Search Report; May 23, 2022; 4 pages.
"International Search Report (Form PCT/ISA/210)" of PCT/CN2020/131287, mailed on May 31, 2021, pp. 1-5.
"Written Opinion of the International Searching Authority (Form PCT/ISA/237)" of PCT/CN2020/131287, mailed on May 31, 2021, pp. 1-4.

* cited by examiner

Contour before correcting    after correcting with a Hough transform

GOLF BALL SET-TOP DETECTION METHOD, SYSTEM AND STORAGE MEDIUM

CROSS-REFERENCE TO RELATED APPLICATION

The present application is a continuation of international application of PCT application No. PCT/CN2020/131287 filed on Nov. 25, 2020, which claims the priority benefit of China application No. 202011000469.7 filed on Sep. 22, 2020. The entirety of the above-mentioned patent applications is incorporated herein by reference and made a part of this specification.

TECHNICAL FIELD

The present application relates to the technical field of golf simulation, in particular to an top-mounted golf ball detection method, a system, and a storage medium.

BACKGROUND ART

A golf system includes a hitting zone, a sensor, a computing unit, and a display screen. The golf system may be used in indoor golf or outdoor golf sports.

When a user hits a golf ball in the hitting zone, the sensor collects the hitting information and movement information of the golf ball, and the computing unit simulates the movement track of the golf ball according to the information and displays the movement track on the display screen. The sensor may be an image sensor or a phototonus sensor, or the like. When the image sensor is used, the image information needs to be analyzed and processed to obtain the movement variation information of the golf ball to simulate its movement track.

However, when the current golf system processes the pictures collected by the image sensor, the overall picture of each frame is processed, that is, the features of the elements in the overall picture of each frame of the picture are processed. Then the coordinate information of the golf ball is acquired in a pixel point positioning mode, that is, the current positioning mode is an overall positioning mode. Because the large-area content of each frame of the picture needs to be repeatedly processed and system resources are occupied, the overall positioning mode causes the golf system to react slowly when the positioning processing is carried out, the efficiency of the system is influenced, and the using experience is influenced.

Therefore, the prior art still needs to be improved.

SUMMARY

In view of the above-described deficiencies of the prior art, it is an object according to the present application to provide a top-mounted golf ball detection method, a system, and a storage medium, aiming at improving the responding speed of the golf system in the positioning processing and improving the using experience of a user.

In order to achieve the above object, the present application adopts the following technical solutions.

In the first aspect, the present application provides a top-mounted golf ball detection method, which is applied to a golf system with a top camera configured for detecting a golf ball provided with a mark thereon, the method includes:

S10, calibrating a camera: converting an image coordinate system of the camera into a world coordinate system;

S20, positioning a golf ball: acquiring coordinate data of the golf ball by performing a global positioning on an entire first frame picture captured by the camera after the ball is served;

for a subsequent frame picture captured by the camera after the ball is served, predicting a falling point range of the golf ball and obtaining a local picture of the frame picture according to the falling point range, and acquiring coordinate data of the golf ball by performing a global positioning on the local picture;

S30, calculating parameters: substituting the coordinate data of the golf ball obtained by the positioning into a world coordinate system to calculate movement parameters of the golf ball; and S40, detecting a rotating speed of the golf ball: extracting a mark on the golf ball in the picture used for positioning by performing a gradient-based dynamic segmentation method, and acquiring the rotating speed based on angular variation of the extracted mark in the picture.

In the second aspect, the present application provides a golf simulation system. The system includes a memory, a processor, and a computer program stored in the memory and configured to be executed by the processor, wherein the processor is configured to execute the computer program for implementing the method described above.

In the third aspect, the present application provides a computer-readable storage medium having a computer program stored thereon, wherein the computer program is executed to implement the method described above.

According to the top-mounted golf ball detection method according to the present application, when the golf ball is positioned, the coordinate data of the golf ball in the first frame picture is acquired in an overall positioning mode in the first frame picture after the ball is served, and the coordinate data of the golf ball is acquired in a predicted falling point range and a local positioning mode in the subsequent positioning. By adopting the mode of combining global positioning with local positioning, when the golf ball in a picture is positioned, it is not required to process the entire picture of each picture for overall positioning such that the responding speed of the golf system in the positioning processing is greatly improved, and the efficiency and user experience of the golf system are improved.

BRIEF DESCRIPTION OF THE DRAWINGS

In order to illustrate the embodiments according to the present application or the technical solutions in the prior art more clearly, the following will briefly introduce the drawings that need to be used in the description of the embodiments or the prior art. Obviously, the drawings in the following description are merely some embodiments according to the present application. For those of ordinary skills in the art, other drawings can be obtained according to the structure shown in these drawings without involving inventive efforts.

DETAILED DESCRIPTION

The technical solutions in the embodiments according to the present application will be clearly and completely described below in conjunction with the accompanying drawings in the embodiments according to the present application. Obviously, the described embodiments are only a part of the embodiments according to the present application, rather than all the embodiments. Based on the embodiments according to the present application, all other embodiments obtained by one of ordinary skills in the art without involving any inventive effort are within the scope according to the present application.

The present application provides a top-mounted golf ball detection method, which is applied to a golf system with a top camera for detecting the movement state of a golf ball provided with a mark thereon.

A golf system that is configured with a top camera can capture a picture with a perspective from the top surface. In such golf system, the background light source is relatively stable, and a human body almost does not overlap with a golf ball. The golf system is suitable for a method of detecting the movement of the golf ball as below to improve the reaction speed of the system.

Figure 1:
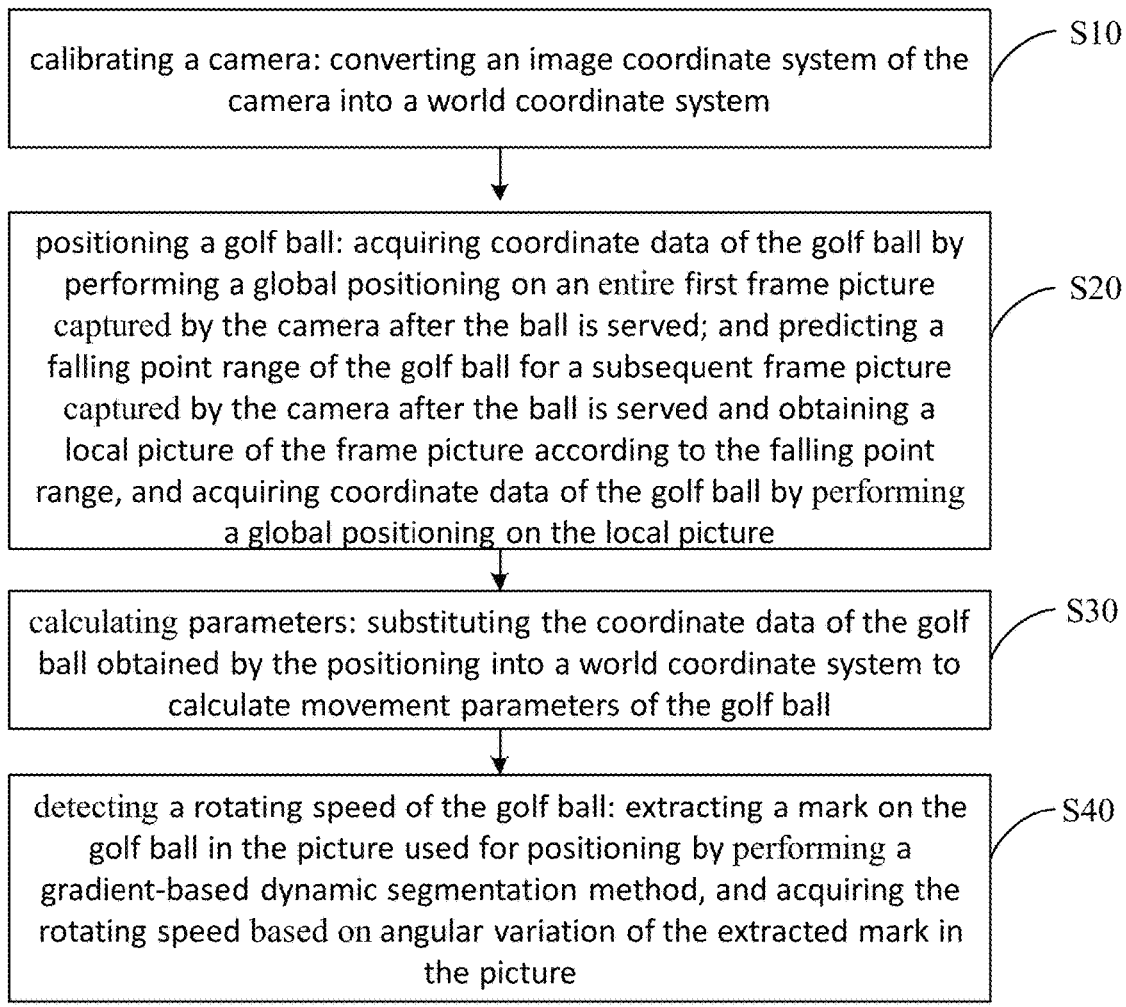
FIG. 1 is a schematic flow diagram of a first embodiment of a top-mounted golf ball detection method according to the present application.

FIG. 1 is a flow diagram of a top-mounted golf ball detection method according to the present application, including steps as follows.

S10, calibrating of a camera: converting an image coordinate system of the camera into a world coordinate system.

In the procedure of image processing, in order to determine a relationship between a three-dimensional geometric position of a point on a surface of a spatial object and its corresponding point in the image, a geometric model of camera imaging must be established. Under most conditions, these parameters must be obtained through experiments and calculations.

The procedure for solving parameters is referred to as camera calibration. Camera calibration is an implementation procedure of converting the mathematical meaning of a real image into computationally operable digitalization.

The calibration of a camera can affect the follow-up calculation precision and avoid the gradually increasing accumulation of errors in the algorithm. It is the key to achieve the effective calculation of a target object.

According to the present application, in the calibration procedure, a fixed number of calibration blocks with a fixed position, different heights, and uniform distribution are adopted. The distribution of the calibration blocks is designed with the highest efficiency based on experiments. The calibration blocks are only required to be calibrated once because the placed calibration blocks contain height information.

The camera according to the present application may be a monocular camera or a binocular camera. In a case of a binocular camera, each camera is independently calibrated.

Figure 2:
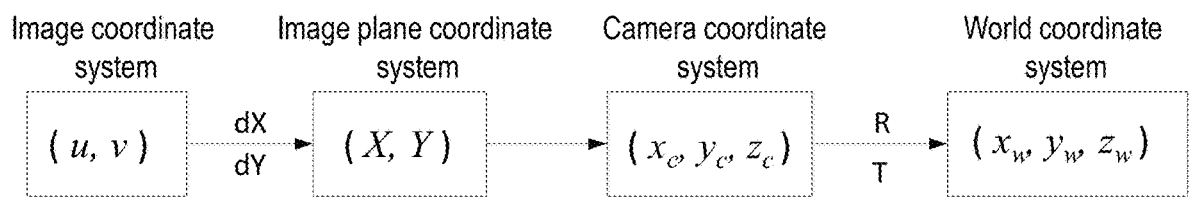
FIG. 2 is a schematic view showing a conversion procedure between an image coordinate system and a world coordinate system according to the present application.

As shown in FIG. 2, the procedure of converting the image coordinate system into the world coordinate system according to the present application includes converting the image coordinate system into an image plane coordinate system, then converting the image plane coordinate system into a camera coordinate system, and then converting the camera coordinate system into the world coordinate system.

In an example of the present application, the image coordinate system of the camera is converted into the world coordinate system based on the following conversion formula:

$$s\begin{bmatrix}u\\v\\1\end{bmatrix}=M_1M_2\begin{bmatrix}x_w\\y_w\\z_w\\1\end{bmatrix}=\begin{bmatrix}m_{11}&m_{12}&m_{13}&m_{14}\\m_{21}&m_{22}&m_{23}&m_{24}\\m_{31}&m_{32}&m_{33}&m_{34}\end{bmatrix}\begin{bmatrix}x_w\\y_w\\z_w\\1\end{bmatrix}=M\begin{bmatrix}x_w\\y_w\\z_w\\1\end{bmatrix},$$

wherein, $M_1$ is an internal reference matrix of the camera, $M_2$ is an external reference matrix of the camera, and $M_1 \times M_2 = M$, and M is a mapping matrix.

When the camera according to the present application is a binocular camera, each camera of the binocular camera is calibrated to obtain a mapping matrix M, and the coordinate and matrix of the binocular camera are substituted to simultaneously solve the world coordinate.

S20, positioning of a golf ball: acquiring the coordinate data of a golf ball by performing global positioning on an entire first frame picture captured by the camera after the ball is served; for a subsequent frame picture captured by the camera after the ball is served, firstly, predicting a falling point range of the golf ball and obtaining a local picture of the frame picture according to the falling point range, and then acquiring coordinate data of the golf ball by performing a global positioning on the local picture.

In the procedure of positioning the golf ball, an overall positioning is performed for positioning the golf ball in the first frame picture after the ball is served, and predicting falling point range is performed for local positioning in subsequent positioning. In the prior art, overall picture positioning is performed on each of the entire frame pictures to acquire coordinate data of a golf ball in each of the frame pictures. However, in such overall positioning, feature processing is required to be performed on all regions in the entire picture, such as target identification, contour edge clarification processing, contour integrity correction, ball center acquisition, ball center coordinate calculation and the like. The processing area of the picture is large, there are many pixels, and the processing speed is slow.

According to the present application, the overall positioning is only performed on the first frame picture once during the first positioning after the ball is served, most regions in the picture are removed during the subsequent positioning, in which the local region picture in the falling point range is reserved, and the positioning is only performed on the reserved local picture. Therefore, the overall positioning flow does not need to be implemented on each frame picture. Because the local picture is much smaller than the original entire picture, the processing speed of the golf system in the positioning procedure can be greatly increased. Meanwhile, because the processing range of the original picture is reduced, and the positioning processing is only performed on the local region, the interference can be effectively eliminated and the processing efficiency and accuracy can be improved.

In an example, the present application further includes triggering of the positioning before positioning a golf ball in step S20, which specifically includes:

acquiring a coordinate of a serving position of a golf ball before the ball is served, monitoring a pixel variation value at the serving position of the golf ball in real time after acquiring the coordinate of the serving position of the golf ball, and when the pixel variation value of the position exceeds a threshold value, triggering positioning to position the golf ball in a picture after the ball is served.

By means of the determination of the positioning trigger, positioning processing of each frame picture before a ball is served can be avoided, the picture processing of the system is reduced, and the response processing speed of the system can be improved.

Before a ball is served, the camera firstly captures a picture, and preliminarily positions and acquires the coordinate of the golf ball at the serving position from the picture. After the coordinate of the serving position of the golf ball is obtained, according to the present application, the variation of the coordinate position of the golf ball is no longer monitored before the ball is served. Instead, the pixel variation value at the serving position of the golf ball is monitored in real time. Because the monitoring of the variation of the coordinate position of the golf ball needs global positioning on the entire picture to be performed, and the monitoring of pixels only needs processing of the local picture at the serving position of the golf ball, which can reduce the processing area and content of the picture. Therefore, changing coordinate positioning to pixel monitoring before the ball is served can increase the response speed of the golf system.

S30, calculating of parameters: substituting the coordinate data of the golf ball obtained by the positioning into the world coordinate system to calculate movement parameters of the golf ball.

Figure 3:
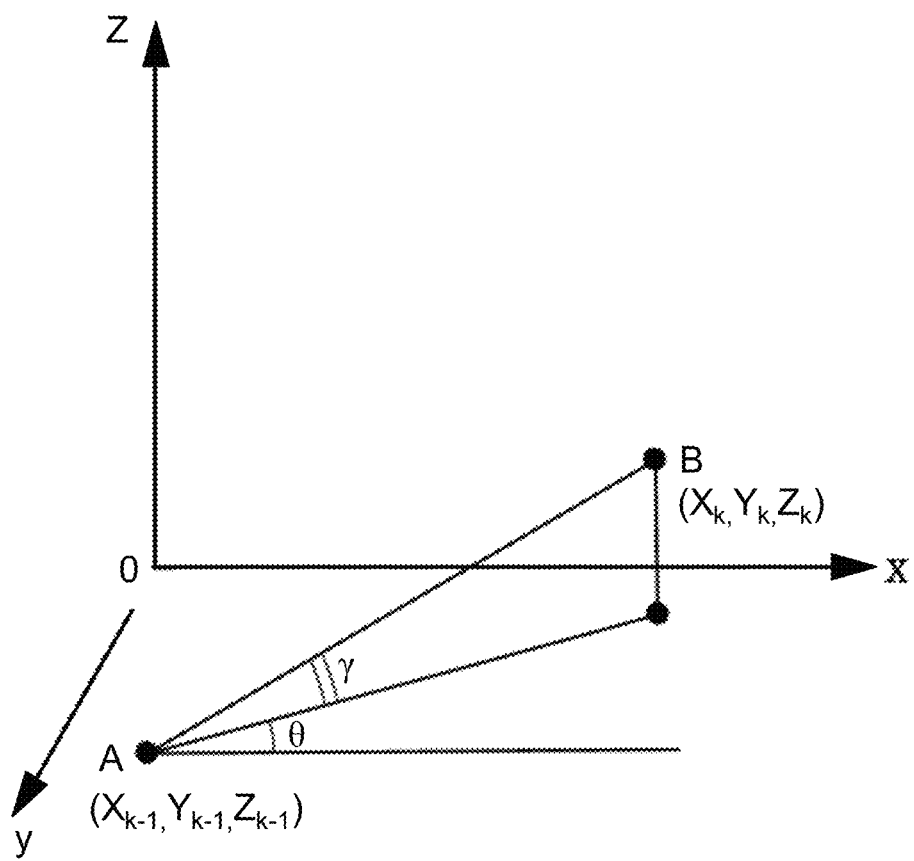
FIG. 3 is a schematic view showing the calculation of a golf ball movement parameter according to the present application.

As shown in FIG. 3, movement parameters can be calculated by converting the coordinate obtained by the positioning in step S20 into a world coordinate. The movement parameters include parameters such as a ball speed, a crab angle, a take-off angle, and the like; θ is the crab angle, γ is the take-off angle, and V is the spatial ball speed.

S40, detecting of the rotating speed of the golf ball: extracting a mark on the golf ball in the picture used for positioning by performing a gradient-based dynamic segmentation method, and acquiring the rotating speed based on the angular variation of the extracted mark in the picture.

According to the present application, a mark is arranged on the golf ball in advance such that the rotating speed can be calculated according to the angular variation of the mark in the picture.

Because the distribution of brightness in the foreground is uneven and the brightness variation of each frame is large, it is quite difficult to extract a mark on the golf ball from the picture at a low resolution, which is not suitable for gray value segmentation. In the present application, the gradient-based dynamic segmentation method can accurately extract the mark on the golf ball from pictures at a low resolution, such that the subsequent rotation detection can be ensured.

With the parameter calculation in step S30, after converting the coordinate obtained by the positioning into a world coordinate, parameters such as the ball speed, the crab angle, the take-off angle, and the like can be calculated. The rotating speed of the golf ball is obtained with combining step S40, and then the complete movement track of the golf ball after hitting the ball and the rotational state of the golf ball on the track can be simulatively calculated. In the present application, the detection and simulation are typically carried out separately, and the simulation is typically completed by the client.

Figure 4:
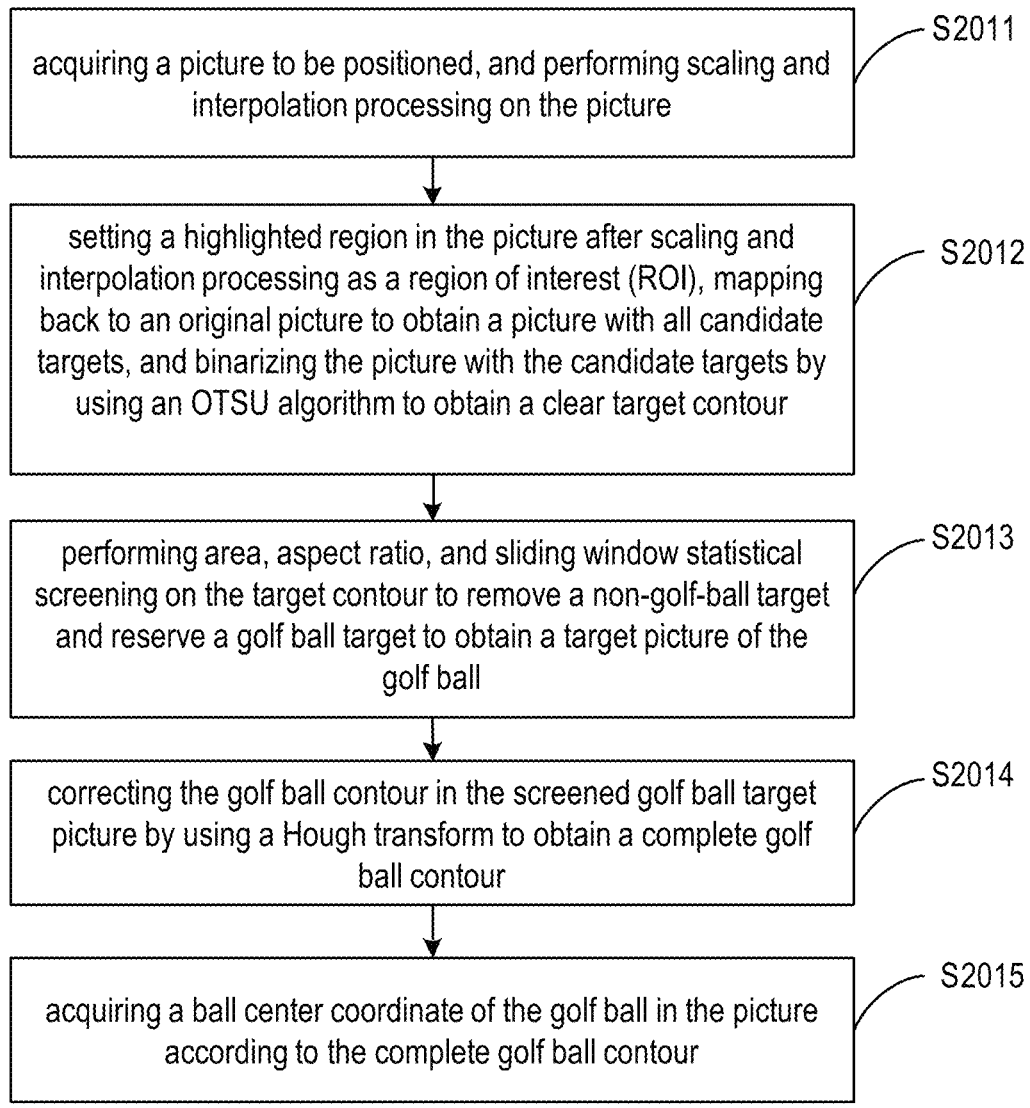
FIG. 4 is a schematic flow diagram of a first embodiment of global positioning of a golf ball according to the present application.

Specifically, as shown in FIG. 4, the present application performs global positioning to acquire the coordinate data of a golf ball, specifically including:

S2011, acquiring a picture to be positioned and performing scaling and interpolation processing on the picture.

As to the first frame picture after the ball is served, the picture to be positioned is an entire picture of the frame picture; and as to the subsequent frame picture, the picture to be positioned is a local picture.

Because a picture captured by the camera contains a large amount of useless information, if all of them are processed, it will affect the speed of the system. Thus, a picture is firstly scaled and interpolated, so as to remove the large amount of useless information in the original picture, and the picture is restored to the size of the original picture. The operation amount of the system is reduced after a large amount of useless information is removed such that the speed is improved. At the same time, this step can also eliminate minor disturbances such as reflections from the club head of the golf club.

Figure 5:
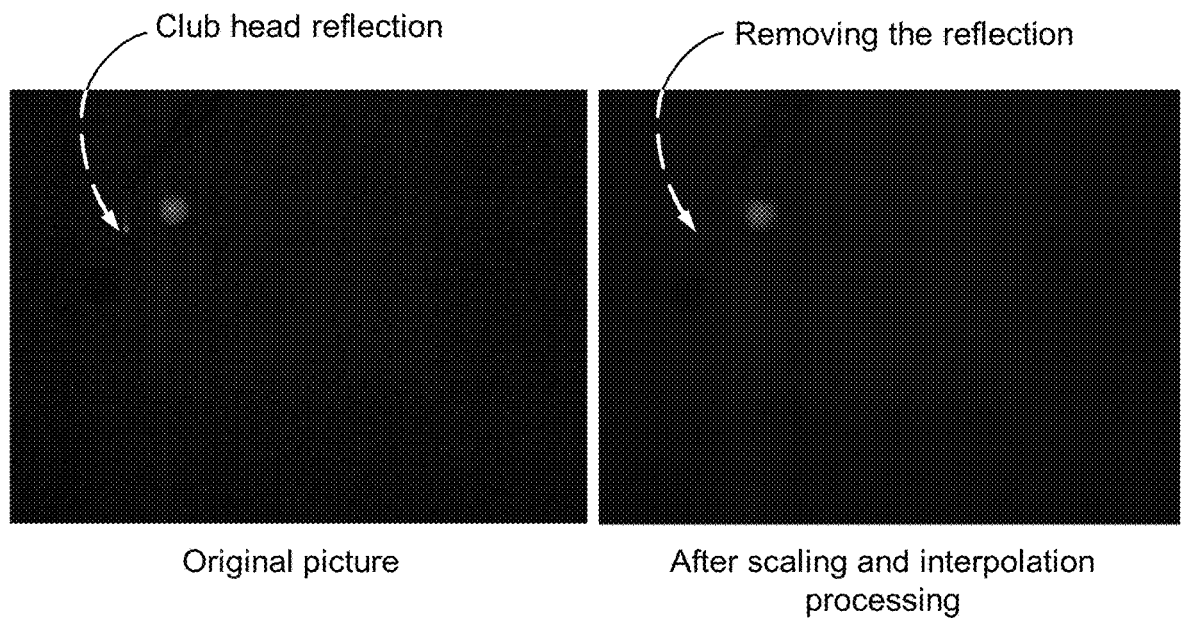
FIG. 5 is a schematic view of a comparison before and after scaling and interpolation processing in global positioning according to the present application.

As shown in FIG. 5, it shows an original picture on the left, which has a large amount of useless information and shows reflections from the club head. The picture is scaled and interpolated to obtain a picture as shown on the right of FIG. 5, in which a large amount of useless information is removed, and the reflections from the club head is also removed.

S2012, setting a highlighted region in the picture after scaling and interpolation processing as a region of interest (ROI), mapping back to the original picture to obtain a picture with all candidate targets, and binarizing the picture with the candidate targets by using the OTSU algorithm to obtain a clear target contour.

This step is used to sharpen the contour of the target objects in the picture. In an embodiment of the present application, the OTSU algorithm is used to binarize all candidate targets in the picture to obtain a clear contour to facilitate the subsequent screening. As shown in A of FIG. 6, it is a picture with a clear target contour after binarization with the OTSU algorithm.

S2013, performing area, aspect ratio, and sliding window statistical screening on the target contour to remove a non-golf-ball target and reserve the golf ball target to obtain a target picture of the golf ball.

This step is used to remove impurities of non-golf-ball targets in the picture, e.g., to remove shapes such as the club in the picture.

Figure 6:
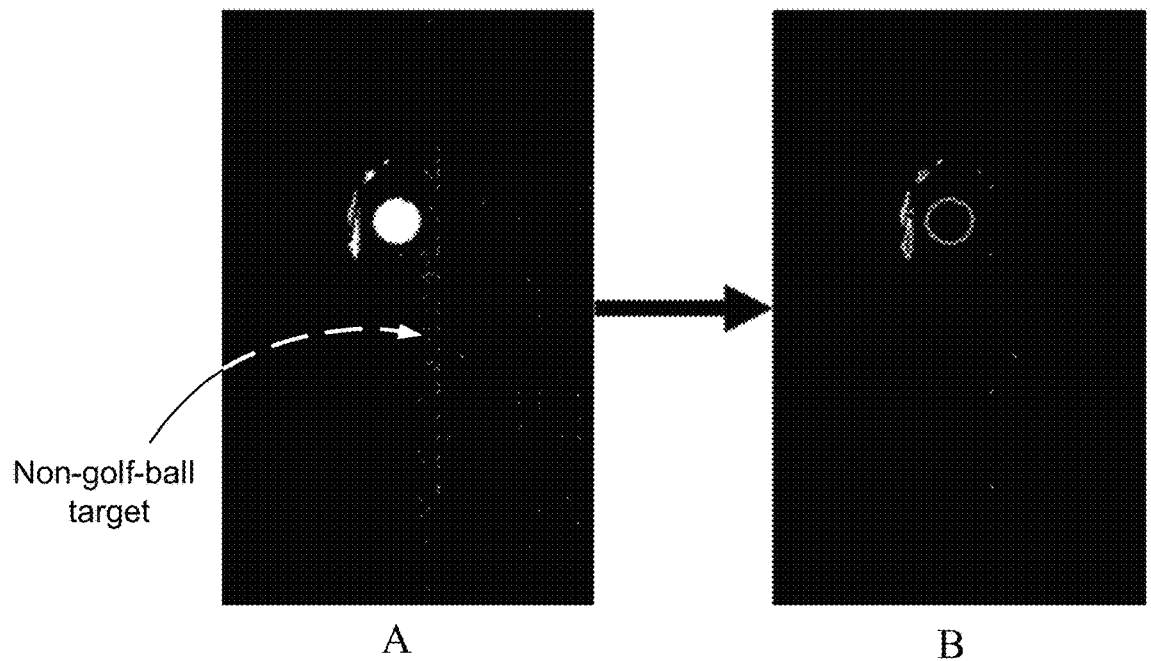
FIG. 6 is a first schematic view of a screening procedure for a target contour area and aspect ratio according to the present application.
Figure 7:
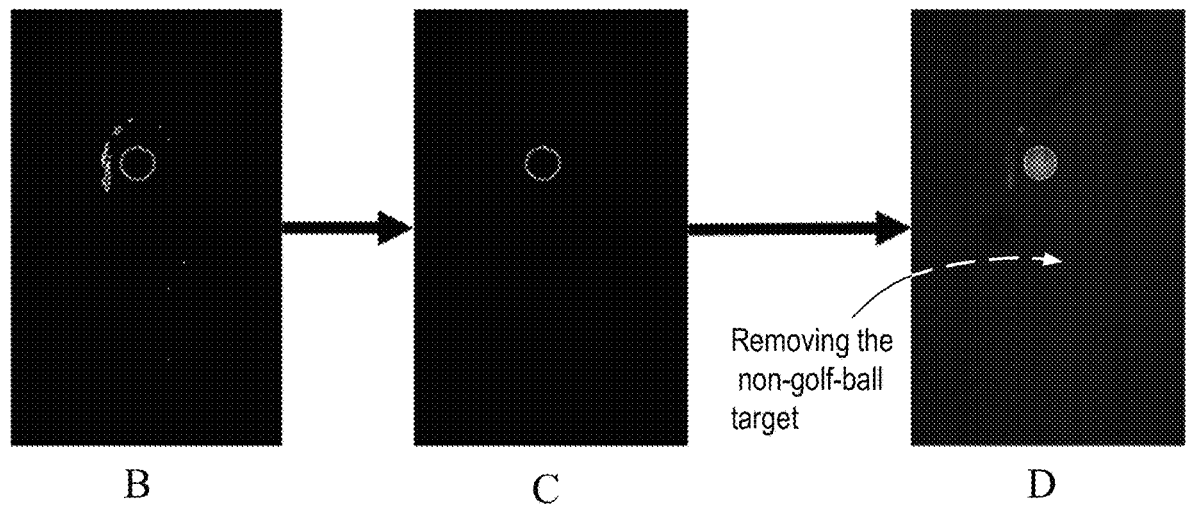
FIG. 7 is a second schematic view of a screening procedure for a target contour area and aspect ratio according to the present application.

As shown in FIGS. 6 to 7, the A of FIG. 6 is a picture binarized with the OTSU algorithm. A picture with impurities is processed with area and aspect ratio screening in sequence, to obtain a picture as shown in D of FIG. 7. Compared with picture A, the non-golf-ball target is removed in picture D.

Further, after performing the area and aspect ratio screening on the target, a sliding window statistical screening is performed to obtain the contour of the golf ball. The sliding window statistical screening of a contour can improve the accuracy of ball contour screening, and avoid excessive screening, which results in missing the ball contour, caused by removing irregular golf ball contours in some pictures.

Figure 8:
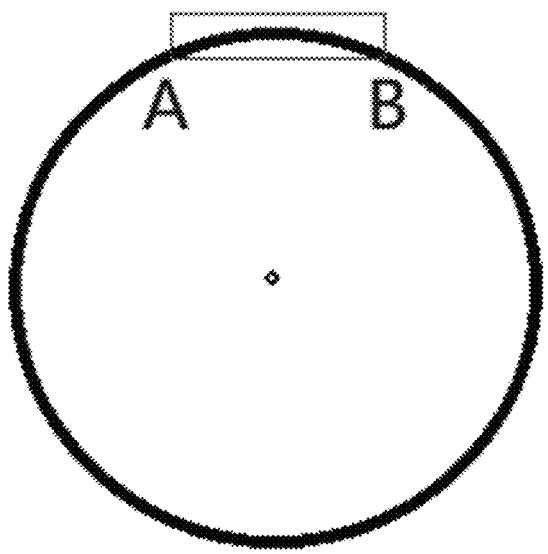
FIG. 8 is a first schematic view of statistical screening of a target contour adopting a sliding window according to the present application.
Figure 9:
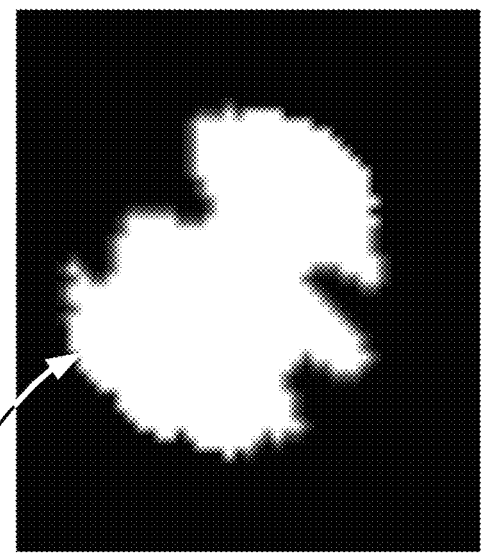
FIG. 9 is a second schematic view of statistical screening of a target contour adopting a sliding window according to the present application.

As shown in FIG. 8, A and B are two points on a foreground contour in a picture. One rectangle is drawn with a connecting line of the two points as the width. The width of the rectangle is controlled by adjusting the distance between the two points of A and B, and the height of the rectangle is adjusted with an empirical value. When the middle point of the contour points A and B is located in the rectangle and conforms to an empirical value with the centroid of the foreground contour, it is determined that the contour between A and B accords with a circular contour. As shown in FIG. 9, although the contour is irregular, if the sliding window statistical screening condition in FIG. 8 is satisfied, the target contour in FIG. 9 can be considered as a golf ball circular contour, which can effectively prevent from excessive screening.

S2014, correcting the golf ball contour in the screened golf ball target picture by using a Hough transform to obtain a complete golf ball contour.

Figure 10:
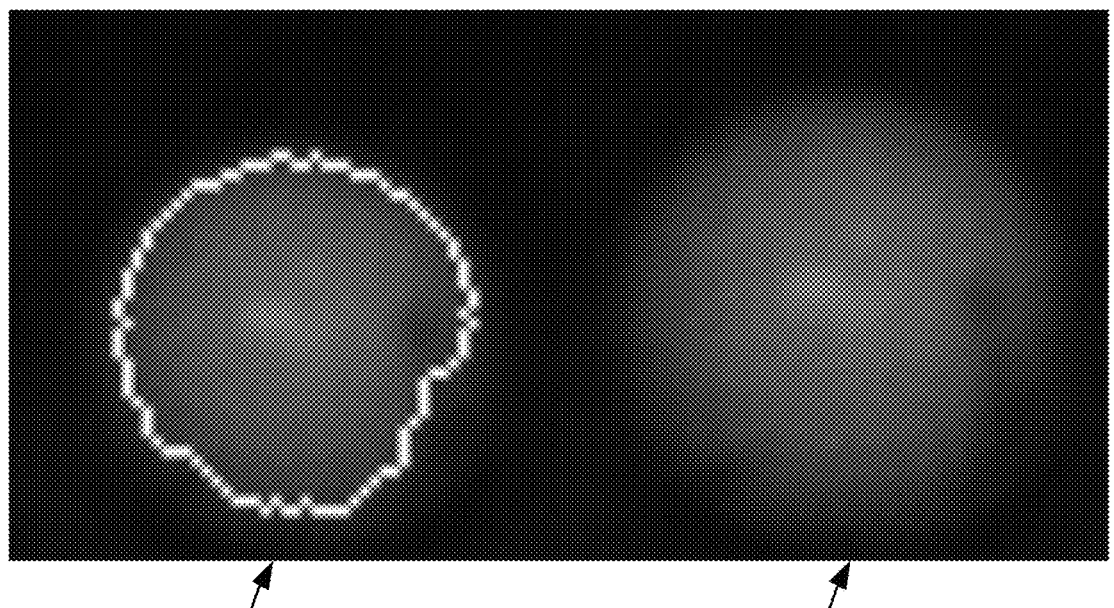
FIG. 10 is a schematic view of a transform correcting procedure of a ball contour in a picture after target screening according to the present application.

Due to factors such as shadows, the contour of the golf ball in the target picture of the golf ball is not one complete circle as shown in the left part of FIG. 10 such that the center of the golf ball cannot be positioned in the picture. Therefore, it is necessary to correct the ball contour in the target picture with transformation. In the embodiment of the present application, a Hough transform is used for such correction to obtain a complete circular contour of the golf ball. A picture with the corrected complete ball contour is shown in the right part of FIG. 10.

S2015, acquiring a ball center coordinate of the golf ball in the picture according to the complete golf ball contour.

In a picture with a complete golf ball contour, the center of the ball can be accurately positioned, and then the ball center coordinate of the golf ball can be obtained based on the coordinate of the pixel point.

Figure 11:
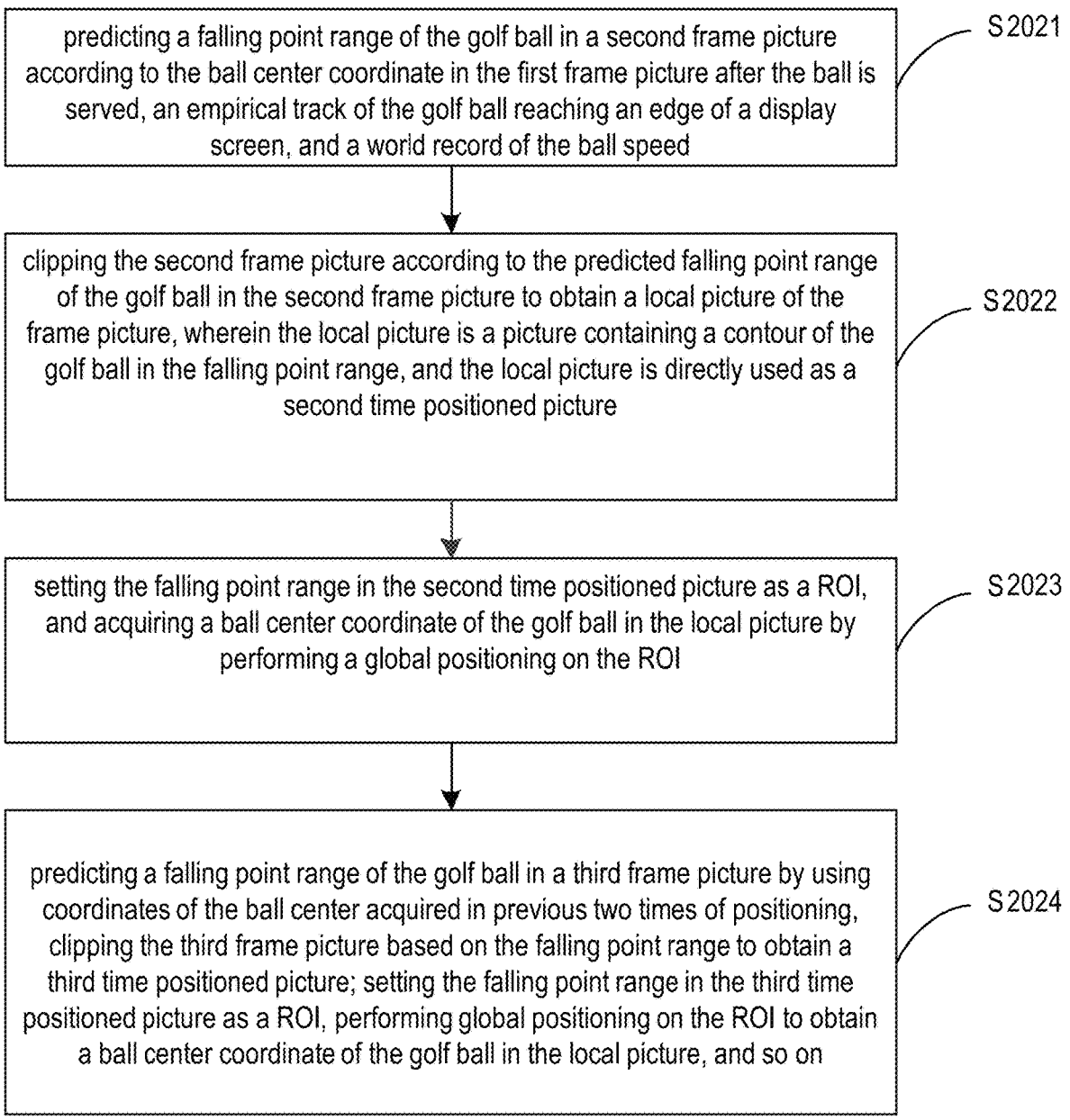
FIG. 11 is a schematic flow diagram of a first embodiment of local positioning of a golf ball according to the present application.

Specifically, as shown in FIG. 11, in the present application, for a subsequent frame picture captured by the camera after the ball is served, predicting a falling point range of the golf ball and obtaining a local picture of the frame picture according to the falling point range, and then acquiring coordinate data of the golf ball by performing global positioning on the local picture specifically includes steps as follows.

S2021, predicting a falling point range of the golf ball in a second frame picture according to the ball center coordinate in the first frame picture after the ball is served, an empirical track of the golf ball reaching an edge of a display screen, and a world record of the ball speed.

The number of tracks of the golf ball reaching the edge of the display screen is limited. A length-width boundary of the falling point range can be obtained based on the world record of the ball speed combining with the limited number of tracks. Then, the falling point range of the golf ball in the second frame picture can be predicted by further combining the ball center coordinate in the first frame picture.

S2022, clipping the second frame picture according to the predicted falling point range of the golf ball in the second frame picture to obtain a local picture of the frame picture, wherein the local picture is a picture containing the contour of the golf ball in the falling point range, and the local picture is directly used as a second time positioned picture.

When the prediction of the falling point range in the second frame picture is finished, the falling point range is used for clipping the second frame picture to obtain a local picture with reduced range to be processed. In the prior art, the entire picture for each of subsequent frames after the first frame picture is required to be processed. However, in the present application, only the local region within the falling point range of the frame picture is processed such that the processing for each picture is reduced, and the processing speed in the positioning procedure of the golf system is improved.

Figure 12:
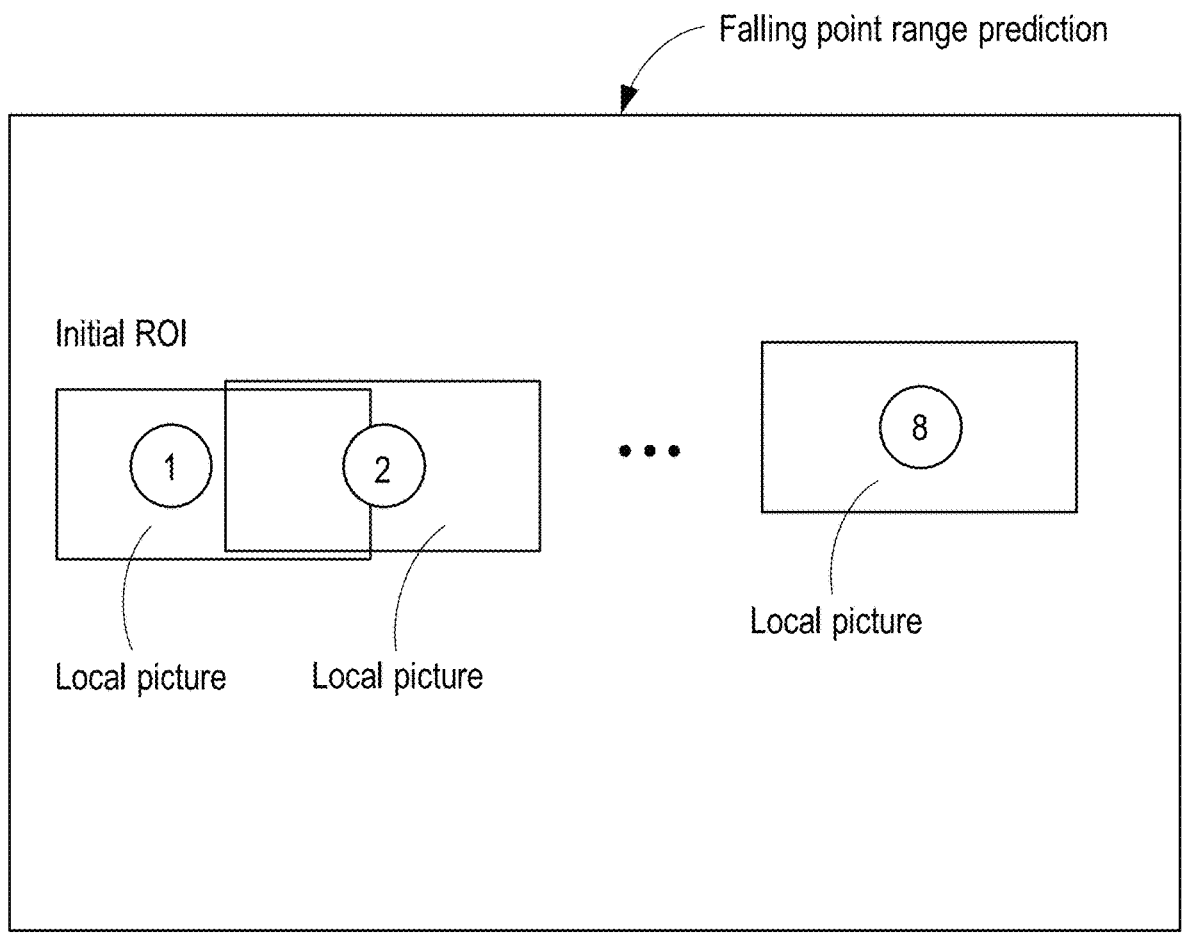
FIG. 12 is a schematic view showing the prediction of a falling point range of a multi-frame picture in the local positioning of a golf ball according to the present application.

In an embodiment of the present application, the second frame picture is clipped to obtain a local picture of the frame picture. Because the track of the golf ball will be necessarily within the falling point range, the local picture therein must have the contour of the golf ball. As shown in FIG. 12, in each prefabrication, the contour of the golf ball is within the predicted falling point range in the frame picture.

S2023, setting the falling point range in the second time positioned picture as a ROI, and acquiring a ball center coordinate of the golf ball in the local picture by performing global positioning on the ROI.

Further, the clipped local picture is not used for the overall positioning as the original picture, instead of setting the falling point range as a ROI (region of interest), and then performing the global positioning method in steps S2011-S2015 on the ROI to acquire the ball center coordinate of the golf ball. That is, the positioning is performed on the picture region of the ROI, which is a small part of the picture region used for local positioning relative to the overall positioning of the entire picture, such that the ball center coordinate of the golf ball in the local picture can be quickly acquired. Compared with the overall positioning in which all regions in the entire picture need to be processed, the local positioning greatly improves the processing speed and responding speed in the positioning processing procedure of the golf system.

S2024, predicting a falling point range of the golf ball in a third frame picture by using coordinates of the ball center acquired in the previous two times of positioning, clipping the third frame picture based on the falling point range to obtain a third time positioned picture; setting the falling point range in the third time positioned picture as a ROI, performing global positioning on the ROI to obtain a ball center coordinate of the golf ball in the local picture, and so on. As shown in FIG. 12, the ball center coordinate in the subsequent positioning procedures can be quickly obtained by sequentially performing predicting of the falling point range of each time of positioning, clipping, and local picture positioning.

In the embodiment of the present application, the falling point range is directly positioned through prediction, and the local picture is further obtained by clipping the picture for positioning such that the picture processing region is reduced, the processing amount of features in the picture during positioning is reduced, the processing speed of the system is greatly improved, the using experience of a user is improved, and bad experiences such as delay, being out of nimbleness, and the like of the system are avoided.

Figure 13:
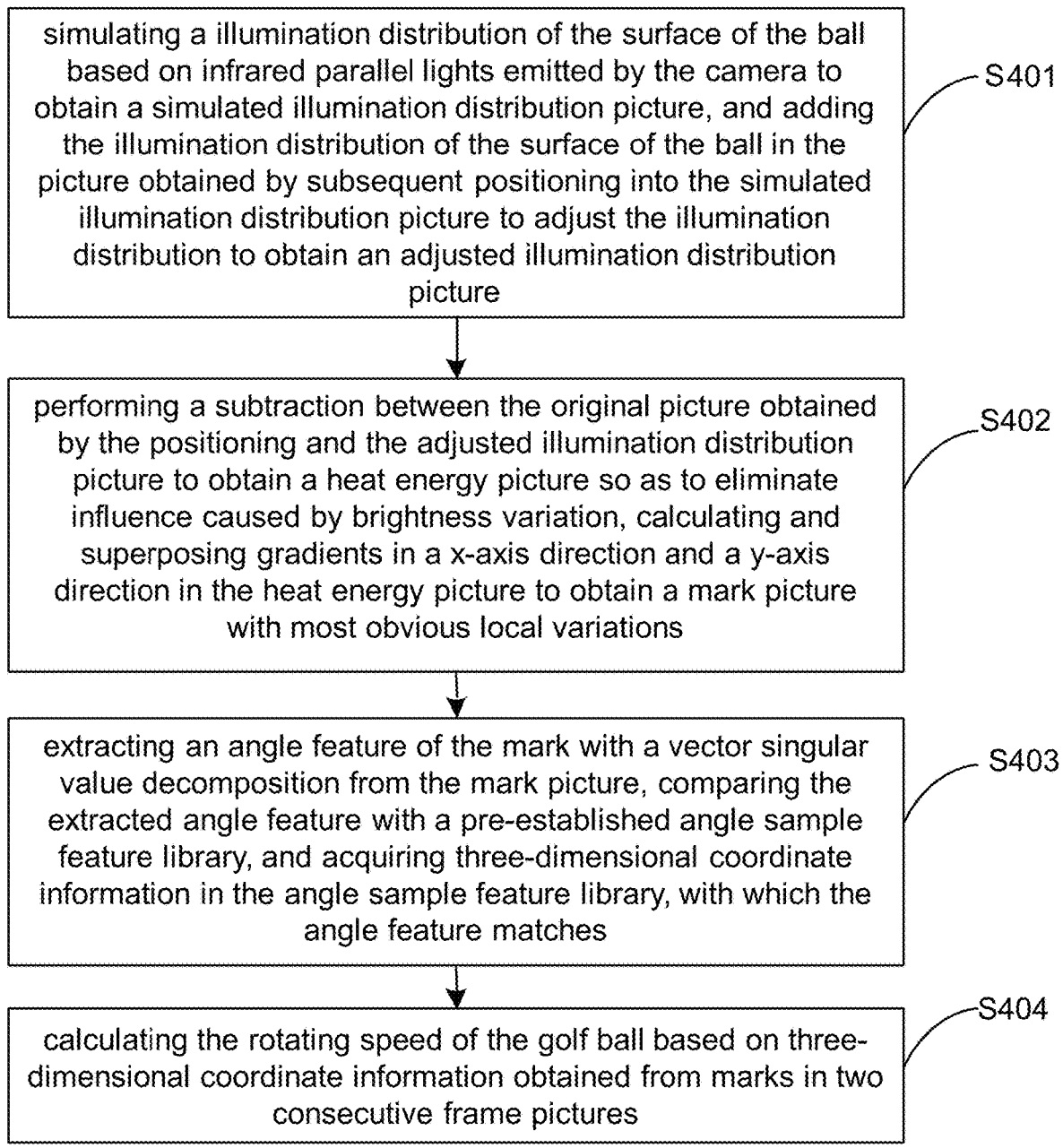
FIG. 13 is a schematic flow diagram of a first embodiment of a golf ball acquiring a rotating speed according to the present application.

Specifically, as shown in FIG. 13, in the present application, extracting a mark on the golf ball in the picture used for positioning by performing a gradient-based dynamic segmentation method, and acquiring the rotating speed based on the angular variation of the extracted mark in the picture specifically includes steps as follows.

S401, simulating a illumination distribution of the surface of the ball based on infrared parallel lights emitted by the camera to obtain a simulated illumination distribution picture, and adding the illumination distribution of the surface of the ball in the picture obtained by subsequent positioning into the simulated illumination distribution picture to adjust illumination distribution to obtain an adjusted illumination distribution picture.

Figure 15:
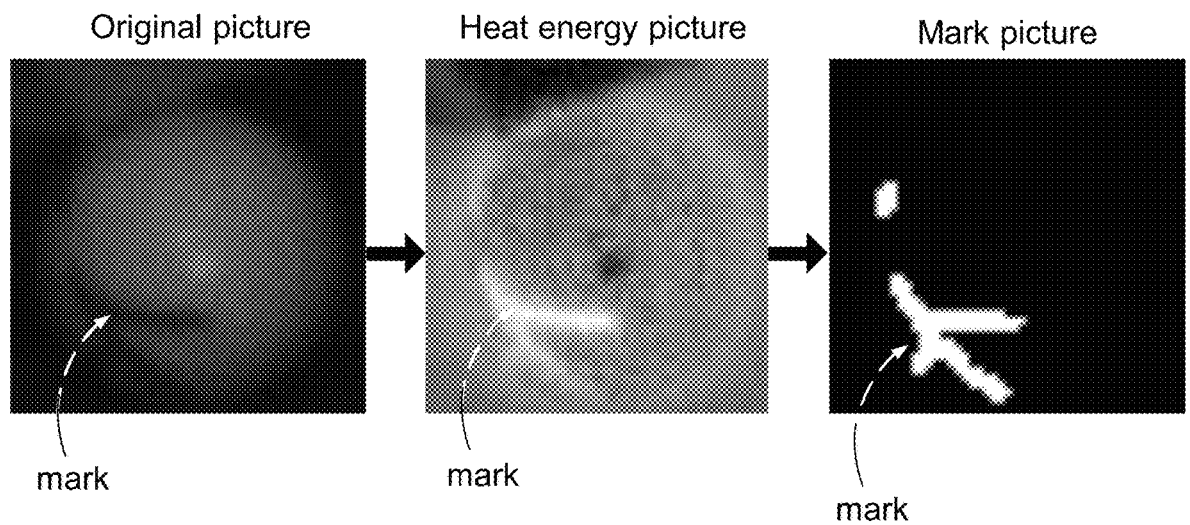
FIG. 15 is a schematic view showing a procedure for obtaining a mark picture in the golf ball rotating speed detection according to the present application.

As shown in the left picture of FIG. 15, in the present application, a mark is arranged in advance on a golf ball such that a mark picture can be obtained according to the mark in the picture.

Figure 14:
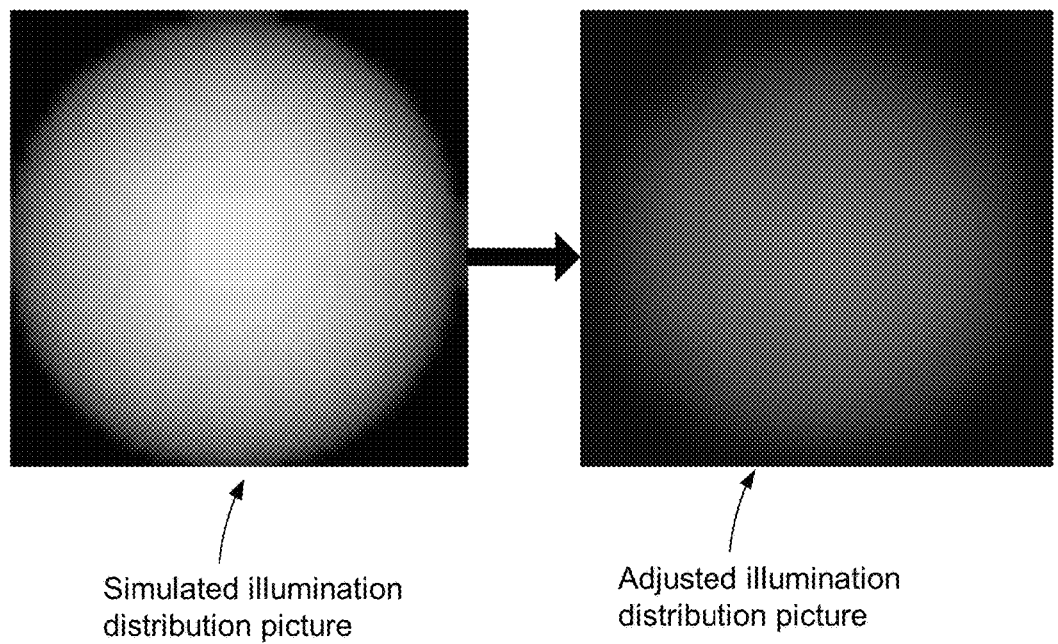
FIG. 14 is a schematic view showing the simulation and adjustment of illumination distribution in golf ball rotating speed detection according to the present application.

As shown on the left of FIG. 14, a simulation distribution of the illumination on the surface of the ball is firstly performed. The simulation distribution is wide in application range, but the distribution effect thereof is poor. Thus, the illumination distribution on the surface of the ball obtained by subsequent positioning is added for adjusting the simulation distribution to obtain the adjusted illumination distribution as shown on the left of FIG. 14, and the optimal illumination distribution effect under the environment can be achieved.

S402, performing a subtraction between the original picture obtained by the positioning and the adjusted illumination distribution picture to obtain a heat energy picture so as to eliminate the influence caused by brightness variation, calculating and superposing gradients in a x-axis direction and a y-axis direction in the heat energy picture to obtain a mark picture with the most obvious local variation.

The brightness distribution of the foreground is uneven, the brightness variation of each frame picture is large, and the resolution ratio of the obtained picture is low. Thus, it is difficult to clearly and accurately obtain the mark on the golf ball with a gray value segmentation. The present application adopts a gradient-based dynamic segmentation method.

As shown in FIG. 15, firstly, a subtraction is performed between the original picture on the left and the adjusted illumination distribution picture to obtain the heat energy picture in the middle. The heat energy picture eliminates the effects caused by brightness variation. Then, gradients in the x-axis direction and the y-axis direction are calculated and superposed in the heat energy picture, i.e. a mark picture with the most obvious local variation on the right is obtained.

S403, extracting an angle feature of the mark with a vector singular value decomposition from the mark picture, comparing the extracted angle feature with a pre-established angle sample feature library, and acquiring three-dimensional coordinate information in the angle sample feature library, with which the angle feature matches.

Singular Value Decomposition (SVD) is used to extract the angle feature of the mark in the mark picture. The angle sample feature library stores various angles of marks on the golf ball, and three-dimensional coordinate information corresponding to various angles. After the angle feature of the mark on the golf ball in the picture is extracted, the angle feature is matched with the angle sample feature library to obtain the corresponding three-dimensional coordinate information.

In one embodiment of the present application, the singular value decomposition (SVD) is used for extracting the angle feature of a mark in the case of a golf ball with a fixed mark. In another embodiment, when the mark on the golf ball is not fixed, the centroid of the mark can be selected as a target point, and the rotating speed can be calculated according to the three-dimensional coordinate corresponding to the surface of the ball of the target point.

S404, calculating the rotating speed of the golf ball based on three-dimensional coordinate information obtained from marks in two consecutive frame pictures.

After the rotating speed of the golf ball is obtained, the rotating state of the golf ball at each point of the track can be simulated by combining the coordinate information obtained by the positioning, and thus the reality of system simulation is improved.

In the top-mounted golf ball detection method according to the embodiment of the present application, in positioning of a golf ball, the coordinate data of the golf ball in a first frame picture is acquired by performing an overall positioning on the first frame picture after the ball is served, and in the subsequent positioning, the coordinate data of the golf ball is acquired by means of predicting of a falling point range and a local positioning. In the present application, by combining of a global positioning with a local positioning, the golf ball in a picture can be positioned without processing of the entire picture of each picture for overall positioning such that the processing speed of the golf system in the positioning procedure is greatly improved, and the efficiency and user experience of the golf system are improved.

The present application also proposes a golf simulation system including a memory, a processor, and a computer program stored in the memory and configured to be executed by the processor, the processor implementing the method described above when executing the computer program.

Taking an example, the computer program can be segmented into one or more modules/units that are stored in the memory and executed by the processor to perform the present application. The one or more modules/units can be a series of computer program instruction segments, capable of performing specific functions, for describing the executing procedure of the computer program in asynchronous message processing terminal equipment.

A master control module may include, but is not limited to, a processor, and a memory. Those skilled in the art will appreciate that the above-described components are merely examples based on the system and are not to be construed as limiting the master module, and may include more or fewer components than those described above, or may combine certain components, or different components. For example, the master control module may also include the input and output equipment, network access equipment, bus, etc.

The processor may be a central processing unit (CPU) or other general purpose processors, a digital signal processor (DSP), an application specific integrated circuit (ASIC), a field-programmable gate array (FPGA) or other programmable logic devices, discrete gate or transistor logic devices, discrete hardware assembly, etc. A general purpose processor may be a microprocessor, or the processor may be any conventional processor or the like. The processor is the control center of the equipment and connects various portions of the entire master control module using various interfaces and lines.

The memory may be used to store the computer program and/or module. The processor implements various functions of the equipment by running or executing the computer program and/or module stored in the memory and invoking the data stored in the memory. The memory can mainly include a storage program region and a storage data region. The storage program region can store an operating system, an application program (such as a sound playing function, an image playing function, and the like) required by at least one function, and the like; the storage data region may store data (such as the audio data, phone book, and the like) created according to use, etc. In addition, the memory may include high speed random access memory, and may also include non-volatile memory such as a hard disk, an internal storage, a plug-in hard disk, a smart media card (SMC), a secure digital (SD) card, a flash card, at least one disk storage device, a flash memory device, or other volatile solid state storage device.

The present application also proposes a computer-readable storage medium having stored therein a computer program that, when executed, implements the method described above.

The integrated module/unit of the top-mounted golf ball detection method according to the present application may be stored in one computer-readable storage medium if implemented in the form of a software functional unit and sold or used as a stand-alone product. The specific implementation mode of the computer-readable storage medium according to the present application is basically the same as each embodiment described above for the top-mounted golf ball detection method, and will not be repeated here.

It should be noted that the above-described embodiments are merely illustrative. The units described as separate components may or may not be physically separated, and the components displayed as units may or may not be physical units, that is, they may be located in one place, or they may be distributed on multiple network units. Some or all of the modules can be selected according to actual needs to achieve the purpose of the scheme of the embodiment. In addition, in the drawings of the embodiments provided by the present application, the connecting relationship between modules indicates that there is a communication connection therebetween, which may be specifically implemented as one or more communication buses or signal lines. A person of ordinary skills in the art would understand and practice that without involving any inventive effort.

The above are only examples to clearly illustrate the present application, and do not thereby limit the patent scope according to the present application. It is not possible to list all implementation modes here. Under the concept according to the present application, any equivalent structural transformation made using the content of the technical solution according to the present application, or the direct/indirect application in other related technical fields are included in the patent protection scope according to the present application.

What is claimed is:

1. A top-mounted golf ball detection method, applied to a golf system with a camera configured on top side for detecting a golf ball provided with a mark thereon, wherein the method comprises:
   calibrating a camera: converting an image coordinate system of the camera into a world coordinate system;
   positioning the golf ball: acquiring coordinate data of the golf ball by performing a global positioning on an entire first frame picture captured by the camera after the ball is served;
   predicting a falling point range of the golf ball for a subsequent frame picture captured by the camera after the ball is served and obtaining a local picture of the frame picture according to the falling point range, and acquiring coordinate data of the golf ball by performing the global positioning on the local picture;
   calculating parameters: substituting the coordinate data of the golf ball obtained by the positioning into a world coordinate system to calculate movement parameters of the golf ball; and
   detecting a rotating speed of the golf ball: extracting the mark on the golf ball in the picture used for positioning by performing a gradient-based dynamic segmentation method, and acquiring the rotating speed based on angular variation of the extracted mark in the picture.

2. The method according to claim 1, wherein the step of converting the image coordinate system of the camera into the world coordinate system is adapted to a conversion formula below:

$$s\begin{bmatrix}u\\v\\1\end{bmatrix}=M_1M_2\begin{bmatrix}x_w\\y_w\\z_w\\1\end{bmatrix}=\begin{bmatrix}m_{11}&m_{12}&m_{13}&m_{14}\\m_{21}&m_{22}&m_{23}&m_{24}\\m_{31}&m_{32}&m_{33}&m_{34}\end{bmatrix}\begin{bmatrix}x_w\\y_w\\z_w\\1\end{bmatrix}=M\begin{bmatrix}x_w\\y_w\\z_w\\1\end{bmatrix},$$

wherein $M_1$ is an internal reference matrix of the camera, $M_2$ is an external reference matrix of the camera, and $M_1 \times M_2 = M$, and M is a mapping matrix.

3. The method according to claim 1, wherein, before the step of positioning the golf ball, the method further comprises triggering the positioning,
   wherein acquiring a coordinate of a serving position of the golf ball before the ball is served, a pixel variation value at a serving position of the golf ball is monitored in real time after acquiring the coordinate of the serving position of the golf ball, and positioning is triggered to position the golf ball in a picture after the ball is served when a pixel variation value of the position exceeds a threshold value.

4. The method according to claim 1, wherein the step of acquiring the coordinate data of the golf ball by performing the global positioning comprises:
   acquiring a picture to be positioned, and performing scaling and interpolation processing on the picture;
   setting a highlighted region in the picture after scaling and interpolation processing as a region of interest (ROI), mapping back to an original picture to obtain a picture with all candidate targets, and binarizing the picture with the candidate targets by using an OTSU algorithm to obtain a clear target contour;
   performing area, aspect ratio, and sliding window statistical screening on the target contour to remove a non-golf-ball target and reserve a golf ball target to obtain a target picture of the golf ball;
   correcting the golf ball contour in the screened golf ball target picture by using a Hough transform to obtain a complete golf ball contour; and
   acquiring a ball center coordinate of the golf ball in the picture according to the complete golf ball contour.

5. The method according to claim 4, wherein the step of predicting the falling point range of the golf ball for the subsequent frame picture captured by the camera after the ball is served and obtaining the local picture of the frame picture according to the falling point range, and acquiring coordinate data of the golf ball by performing the global positioning on the local picture comprises:

predicting the falling point range of the golf ball in a second frame picture according to the ball center coordinate in the first frame picture after the ball is served, an empirical track of the golf ball reaching an edge of a display screen, and a world record of the ball speed;

clipping the second frame picture according to the predicted falling point range of the golf ball in the second frame picture to obtain the local picture of the frame picture, wherein the local picture is a picture containing a contour of the golf ball in the falling point range, and the local picture is directly used as a second time positioned picture;

setting the falling point range in the second time positioned picture as the ROI, and acquiring a ball center coordinate of the golf ball in the local picture by performing a global positioning on the ROI; and predicting the falling point range of the golf ball in a third frame picture by using coordinates of the ball center acquired in previous two times of positioning, clipping the third frame picture based on the falling point range to obtain a third time positioned picture; and setting the falling point range in the third time positioned picture as the ROI, and performing global positioning on the ROI to obtain the ball center coordinate of the golf ball in the local picture, and so on.

6. The method according to claim 1, wherein the step of extracting the mark on the golf ball in the picture used for positioning by performing a gradient-based dynamic segmentation method, and acquiring the rotating speed based on angular variation of the extracted mark in the picture comprises:

simulating a illumination distribution of the surface of the ball based on infrared parallel lights emitted by the camera to obtain a simulated illumination distribution picture, and adding the illumination distribution of the surface of the ball in the picture obtained by subsequent positioning into the simulated illumination distribution picture to adjust the illumination distribution to obtain an adjusted illumination distribution picture;

performing a subtraction between the original picture obtained by the positioning and the adjusted illumination distribution picture to obtain a heat energy picture so as to eliminate influence caused by brightness variation, calculating and superposing gradients in a x-axis direction and a y-axis direction in the heat energy picture to obtain a mark picture with most obvious local variations;

extracting an angle feature of the mark with a vector singular value decomposition from the mark picture, comparing the extracted angle feature with a pre-established angle sample feature library, and acquiring three-dimensional coordinate information in the angle sample feature library, with which the angle feature matches; and calculating the rotating speed of the golf ball based on three-dimensional coordinate information obtained from marks in two consecutive frame pictures.

7. A golf simulation system, wherein the golf simulation system comprises a memory, a processor, and a computer program stored in the memory and configured to be executed by the processor, wherein the processor is configured to execute the computer program for implementing the method of claim 1.

8. A computer-readable storage medium, wherein the computer-readable storage medium stores a computer program thereon, wherein the computer program is executed to implement the method of claim 1.

* * * * *